(12) United States Patent
Song (10) Patent No.: US 7,929,069 B2
(45) Date of Patent: *Apr. 19, 2011

(54) THIN FILM TRANSISTOR SUBSTRATE FOR A LIQUID CRYSTAL DISPLAY

(75) Inventor: Jang-Kun Song, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/328,509

(22) Filed: Dec. 4, 2008

(65) Prior Publication Data

US 2009/0087933 A1  Apr. 2, 2009

Related U.S. Application Data

(60) Continuation of application No. 11/519,616, filed on Sep. 12, 2006, now Pat. No. 7,515,218, which is a division of application No. 10/933,540, filed on Sep. 3, 2004, now Pat. No. 7,106,391, which is a division of application No. 09/862,588, filed on May 23, 2001, now Pat. No. 6,788,356.

(30) Foreign Application Priority Data

May 23, 2000 (KR) .................................. 2000-27832

(51) Int. Cl.
*G02F 1/136* (2006.01)
*G02F 1/1333* (2006.01)
(52) U.S. Cl. ............... 349/44; 349/43; 349/54; 349/110
(58) Field of Classification Search .................... 349/54, 349/43, 110, 44
See application file for complete search history.

(56) References Cited

U.S. PATENT DOCUMENTS 5,128,786 A * 7/1992 Yanagisawa .................. 349/111
(Continued)

FOREIGN PATENT DOCUMENTS

JP  02-254419  10/1990
(Continued)

OTHER PUBLICATIONS

English Abstract for Publication No. 09-080468.
(Continued)

*Primary Examiner* — Mike Qi
(74) *Attorney, Agent, or Firm* — F. Chau & Associates, LLC (57) ABSTRACT

Disclosed is a thin film transistor substrate for a liquid crystal display and a method for repairing the substrate. The substrate comprises an insulating substrate; a black matrix formed on the insulating substrate having apertures in areas of pixels, shaped as a net; an insulating layer covering the black matrix; gate wiring formed on the insulating layer, the gate wiring including gate lines extended in a first direction across the substrate and gate electrodes connected to the gate lines; a gate insulating layer formed over the gate wiring; a semiconductor layer formed over the gate insulating layer; an ohmic contact layer formed over the semiconductor layer; data wiring including source electrodes and drain electrodes formed separated from each other over the ohmic contact layer, and data lines connected to the source electrodes and crossing the gate lines to define pixels; a protection layer formed over the data wiring; and pixel electrodes electrically connected to the drain electrodes. The method comprises the step of shorting the disconnected gate line and the first portion of the black matrix or the disconnected data line and the second portion of the black matrix.

11 Claims, 7 Drawing Sheets

U.S. PATENT DOCUMENTS 6,788,356 B2 * 9/2004 Song .............................. 349/43
7,515,218 B2 * 4/2009 Song .............................. 349/54

FOREIGN PATENT DOCUMENTS

| | | |
|---|---|---|
| JP | 09-080468 | 3/1997 |
| JP | 09-230371 | 9/1997 |
| JP | 11-242225 | 9/1999 |
| JP | 2000-010120 | 1/2000 |

OTHER PUBLICATIONS

English Abstract for Publication No. 09-230371.
English Abstract for Publication No. 11-242225.
English Abstract for Publication No. 02-254419.
English Abstract for Publication No. 2000-010120.

* cited by examiner

FIG.7D

THIN FILM TRANSISTOR SUBSTRATE FOR A LIQUID CRYSTAL DISPLAY

CROSS REFERENCE TO PRIOR APPLICATION

This application is Continuation application of U.S. patent application Ser. No. 11/519,616 filed Sep. 12, 2006, now U.S. Pat. No 7,515,218 which is a Divisional Application of U.S. application Ser. No. 10/933,540 now U.S. Pat. No. 7,106,391 filed Sep. 3, 2004, which is a Divisional Application of U.S. application Ser. No. 09/862,588 now U.S. Pat. No. 6,788,356 filed May 23, 2001, which claims the benefit of Korean Patent Application No. 2000-27832, filed on May 23, 2000, in the Korean Intellectual Property Office, the disclosures of which are herein incorporated by reference.

BACKGROUND OF THE INVENTION (a) Field of the Invention

The present invention relates to a thin film transistor substrate for a liquid crystal display and a method for repairing the substrate.

(b) Description of the Related Art

Liquid crystal displays are at present the most commonly used flat panel displays. The liquid crystal display (LCD) is structured to have liquid crystal material injected between two substrates. A voltage of a different potential is applied to electrodes of the substrates to form an electric field such that the alignment of liquid crystal molecules of the liquid crystal material changes. Accordingly, the transmittance of incident light is controlled to enable the display of images.

Among the different types of LCDs, the thin film transistor (TFT) LCD is the most typically applied configuration. In the TFT-LCD, thin film transistors and pixel electrodes are formed on one of the two substrates, and a color filter, a black matrix and a common electrode are formed on the other substrate, with the common electrode being formed over an entire surface of this substrate. The thin film transistors switch the voltage applied to the electrodes of the substrates.

To improve the brightness of the TFT-LCD, a high aperture ratio of the substrates must be obtained. However, the black matrix with a large width in order to compensate for differences in alignment of the two substrates reduces the aperture ratio.

SUMMARY OF THE INVENTION

The present invention has been made in an effort to solve the above problems.

It is an object of the present invention to provide a thin film transistor substrate for a liquid crystal display and a method for repairing the substrate, in which a high aperture ratio of the liquid crystal display is ensured.

To achieve the above object, the present invention provides a thin film transistor substrate for a liquid crystal display and a method for repairing the substrate. The thin film transistor substrate for a liquid crystal display comprises an insulating substrate; a black matrix formed on the insulating substrate having apertures in areas of pixels, which are provided in a matrix, such that the black matrix resembles a net; an insulating layer covering the black matrix; gate wiring formed on the insulating layer, the gate wiring including gate lines extended in a first direction across the substrate and gate electrodes connected to the gate lines; a gate insulating layer formed over the gate wiring; a semiconductor layer formed over the gate insulating layer; an ohmic contact layer formed over the semiconductor layer; data wiring including source electrodes and drain electrodes formed separated from each other over the ohmic contact layer, and data lines connected to the source electrodes and crossing the gate lines to define pixels; a protection layer formed over the data wiring; and pixel electrodes electrically connected to the drain electrodes.

According to a feature of the present invention, the substrate further comprises a buffer layer formed on the same layer as the gate wiring and the data wiring, the buffer layer being formed between portions of the black matrix.

According to another feature of the present invention, the black matrix includes first portions overlapping the gate lines, and second portions separated from the first portions and overlapping the data lines.

According to yet another feature of the present invention, a portion of the black matrix overlapping the gate wiring or the data wiring is removed.

According to still yet another feature of the present invention, the black matrix is formed overlapping adjacent pixel electrodes.

According to still yet another feature of the present invention, a width of overlapping of the pixel electrodes and the black matrix is in the range of 0.5-2 µm.

According to still yet another feature of the present invention, the pixel electrodes and the data lines are spaced apart at a distance in the range of 2-6 µm.

According to still yet another feature of the present invention, the insulating layer contains silicon oxide.

According to still yet another feature of the present invention, the insulating layer is formed at a thickness of 0.5-3 µm.

According to still yet another feature of the present invention, the substrate is used in a vertically-aligned liquid crystal display, in which liquid crystal molecules are aligned vertically to the substrate.

According to still yet another feature of the present invention, liquid crystal molecules are aligned parallel to the substrate and the pixel electrodes are formed linearly, and it further comprises a linear common electrode opposing the pixel electrodes.

According to still yet another feature of the present invention, the substrate further comprises storage electrodes overlapping the pixel electrodes to form a storage capacitance.

The method for repairing a thin film transistor substrate for a liquid crystal display comprises the step of shorting the disconnected gate line and the first portion matrix or the disconnected data line and the second portion of the black matrix.

A liquid crystal display comprises an insulating first substrate; a black matrix formed on the insulating substrate having apertures in areas of pixels, which are provided in a matrix, such that the black matrix resembles a net; an insulating layer covering the black matrix; gate wiring formed on the insulating layer, the gate wiring including gate lines extended in a first direction across the substrate and gate electrodes connected to the gate lines; a gate insulating layer formed over the gate wiring; a semiconductor layer formed over the gate insulating layer; an ohmic contact layer formed over the semiconductor layer; data wiring including source electrodes and drain electrodes formed separated from each other over the ohmic contact layer, and data lines connected to the source electrodes and crossing the gate lines to define pixels; a protection layer formed over the data wiring; pixel wiring including pixel electrodes electrically connected to the drain electrodes through contact holes of the protection layer; an insulating second substrate provided opposing the first substrate; and a common electrode formed on the second substrate, the common electrode opposing the pixel electrodes to form an electric field for driving liquid crystal molecules.

According to a feature of the present invention, the liquid crystal display further comprises a buffer layer formed on the same layer as the gate wiring and the data wiring, the buffer layer being formed between portions of the black matrix.

According to another feature of the present invention, the black matrix includes first portions overlapping the gate lines, and second portions separated from the first portions and overlapping the data lines.

According to yet another feature of the present invention, the liquid crystal molecules are aligned vertically to the first and second substrates.

According to still yet another feature of the present invention, the pixel electrodes include one or more aperture patterns to disperse a slanting direction of the liquid crystal molecules such that the liquid crystal molecules are aligned in different directions.

According to still yet another feature of the present invention, the common electrode includes one or more aperture patterns to disperse a slanting direction of the liquid crystal molecules such that the liquid crystal molecules are aligned in different directions.

According to still yet another feature of the present invention, the aperture patterns align the liquid crystal molecules into four different directions.

According to still yet another feature of the present invention, the liquid crystal display further comprises storage electrodes overlapping the pixel electrodes to form a storage capacitance.

According to still yet another feature of the present invention, the liquid crystal display further comprises a light-blocking layer formed in a center portion of the aperture patterns or at areas corresponding to edges of the aperture patterns.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
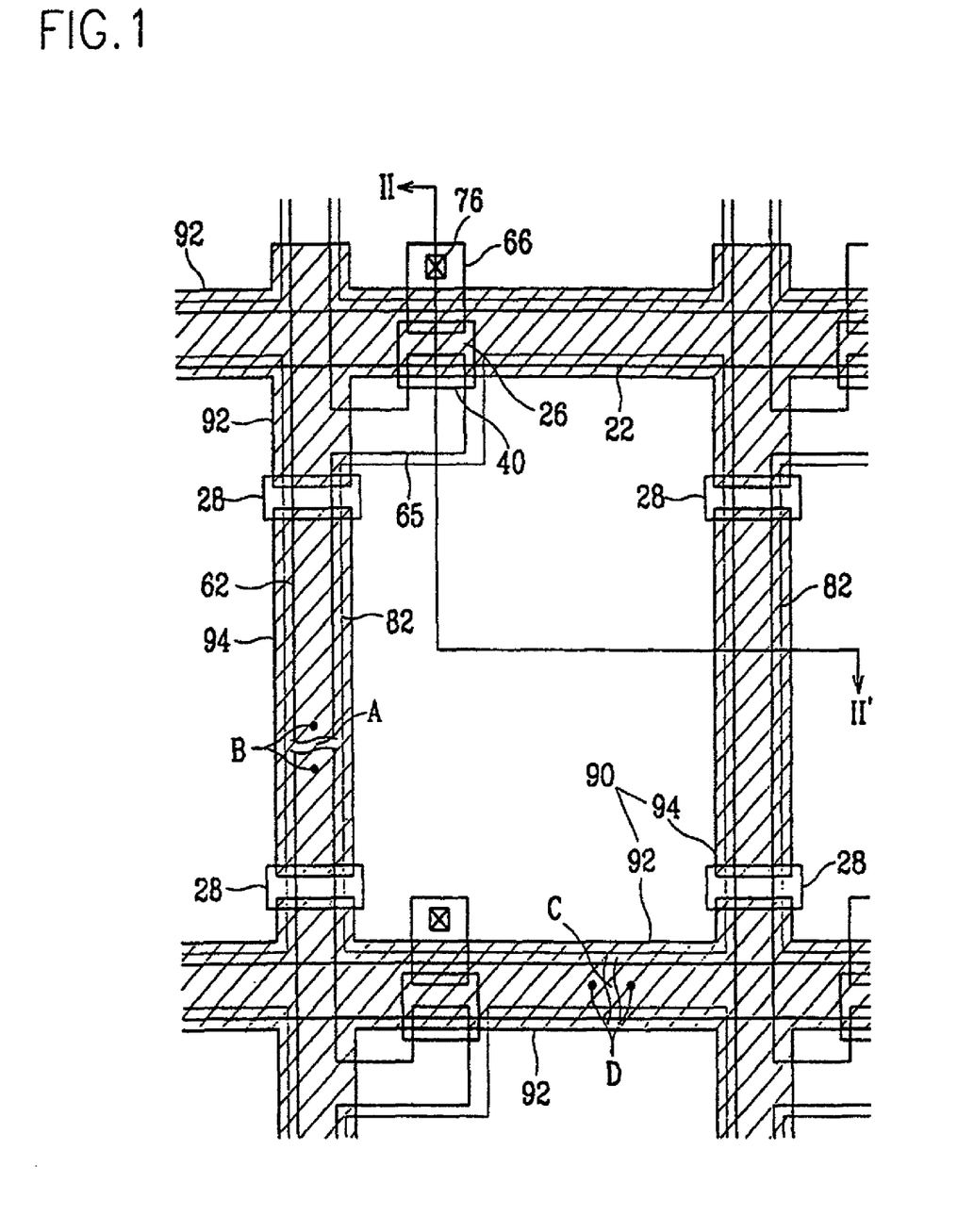
FIG. 1 is a schematic view of a thin film transistor substrate according to a first preferred embodiment of the present invention.
Figure 2:
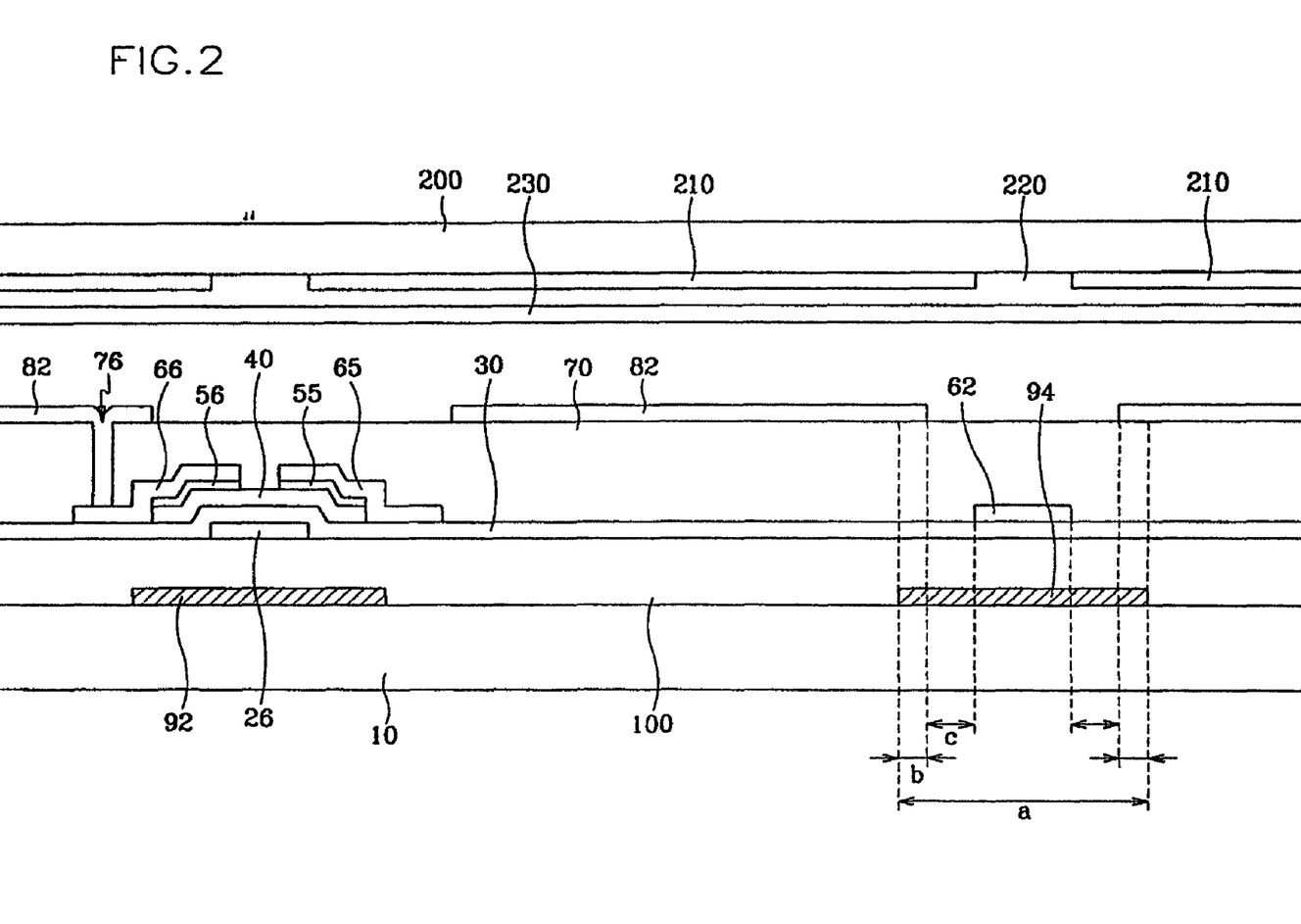
FIG. 2 is a sectional view taken along line 11 11' of FIG. 1.

FIG. 1 shows a schematic view of thin film transistor substrate according to a first preferred embodiment of the present invention, and FIG. 2 shows a sectional view taken along line 11 11' of FIG. 1.

A black matrix 90 is formed on an inner surface of an insulating lower substrate 10. The black matrix 90 is a single- or multi-layered material that includes a non-transparent insulating material, chromium nitride, or molybdenum nitride. Also, the black matrix 90 includes apertures in areas of pixels such that the black matrix 90 forms a net-like shape when viewed as a whole. That is, the black matrix 90 includes horizontal portions 92 that horizontally extend (in FIG. 1) in parallel over the surface of the lower substrate 10 at a predetermined distance from each other, and vertical portions 94 that vertically extend (in FIG. 1) in parallel over the surface of the lower substrate 10 at a predetermined distance from each other. With this configuration, the black matrix 90 blocks the leakage of light between the pixels. The black matrix 90 may be formed differently to block light irradiated onto a semiconductor layer 40 (to be described below). In addition, areas where the horizontal portions 92 intersect the vertical portions 94 act to minimize interference between scanning signals and data signals, which are transmitted to gate lines 22 and data lines 62 (to be described below), and to minimize the delay of the signals.

An insulating layer 100 is formed over the black matrix 90. It is preferable that the insulating layer 100 is made of SiOx, which has a low level of anisotropy in the range of 3.0-4.0, and that the insulating layer 100 has a thickness of between 0.5 and 3.0 μm. If these conditions are met, the delay of signals is minimized.

Gate wiring is formed on the insulating layer 100. The gate wiring is made of metal or conducting material such as aluminum (Al), aluminum alloy, molybdenum (Mo), molybdenum-tungsten (MoW) alloy, chrome, tantalum (Ta), copper (Cu), or copper alloy. The gate wiring is formed extending horizontally (in FIG. 1) and includes scanning signal lines or the gate lines 22, and gate electrodes 26 of a thin film transistor. The gate lines 22 overlap pixel electrodes 82 (to be described below) to form storage capacitors that improve the charge retention capability of the pixels. When the storage capacity resulting from the overlapping of the pixel electrodes 82 and gate lines 22 is not sufficient enough, storage capacity wiring may be additionally formed. A buffer layer 28 is formed on the same layer as the gate lines 22 and the gate electrodes 26 of the gate wiring. The buffer layer 28 acts to block the leakage of light in areas between the horizontal portions 92 and the vertical portions 94 of the black matrix 90.

A gate insulating layer 30 made of a material such as SiNx is formed on the insulating layer 100 covering the elements 22 and 26 of the gate wiring. Also, the semiconductor layer 40 is formed over the gate insulating layer 30 at areas corresponding to the gate electrodes 26. The semiconductor layer 40 is made of a semiconductor material such as hydrogenated amorphous silicon. By forming the gate insulating layer 30 and the semiconductor layer 40 overlapping the gate electrodes 26, the gate insulating layer 30 and the semiconductor layer 40 (and all elements to be formed thereon) protrude upward.

Ohmic contact layers 55 and 56 are formed over the semiconductor layer 40. The ohmic contact layers 55 and 56 include amorphous silicon doped at a high concentration with n-type impurities, minutely crystallized silicon, or metal silicide. The ohmic contact layers 55 and 56 are separated about the gate electrodes 26.

Data wiring is formed over the gate insulating layer 30 and the ohmic contact layers 55 and 56. The data wiring is made of such low-resistance material as an aluminum group, copper group, or silver group. The data wiring includes the data lines 62, which are formed vertically (in FIG. 1) to intersect the gate lines 22 and thereby form unit pixels; source electrodes 65 of a thin film transistor; and drain electrodes 66 of a thin film transistor. The source electrodes 65 is connected to the data lines 62 and positioned over the ohmic contact layer 55. The drain electrodes 66 is formed on the ohmic contact layer 56 separated from the source electrodes 65 on an opposite side of gate electrodes 26.

A protection layer 70 is formed over the elements 62, 65 and 66 of the data wiring. The protection layer 70 is made of an organic insulating material such as silicon nitride or an acryl group material. Also, the protection layer 70 includes contact holes 76 that expose the drain electrodes 66.

The pixel electrodes 82 are formed on the protection layer 70. The pixel electrodes 82 receive image signals from the thin film transistor and form an electric field together with an electrode of an opposing substrate. Further, the pixel electrodes 82 are made of a transparent conducting material such as indium tin oxide (ITO) or indium zinc oxide (IZO), and are physically and electrically connected to the drain electrodes 66 via the contact holes 76 of the protection layer 70 to receive the image signals.

Using an imaginary axis formed in parallel with the lower substrate 10, it is preferable that a distance (b) of an overlapping portion of the pixel electrodes 82 and the black matrix 94 is 0.5 2 μm, and a distance (c) from the pixel electrodes 82 to the data lines 62 is 2 61 μm. A width (a) of the black matrix 94 is determined by the sum of a width of the data lines 62 and twice each of the distances (b) and (c), and may vary depending on the type of metal used for the data lines 62.

Formed on an inner surface of an insulating upper substrate 200, which opposes the lower substrate 10, and in the area of the pixels are RGB color filters 210. A protection layer 220 is formed over the color filters 210. The protection layer 220 may be omitted, as it is not an essential element. A common electrode 230 is formed over an entire surface of the protection layer 220. The common electrode 230 forms an electric field with the pixel electrodes 82 to drive liquid crystal molecules. It is preferable that the color filters 210 are formed apart from each other less than 4 μm to minimize the light reflected by the elements 22 and 26 of the gate wiring, and by the elements 62, 65 and 66 of the data wiring. Also, the color filters 210 may be formed with edges overlapping an area corresponding to edges of the black matrix 90. Reflection preventing layers may be formed between the color filters 210 in such a way that an aperture ratio is not negatively influenced.

In the liquid crystal display described above, since the black matrix 90 is also provided on the lower substrate 10, on which are formed the pixel electrodes 82 and the thin film transistors, the alignment error in assembling the two substrates 10 and 200 is dramatically reduced. Accordingly, the black matrix 90 is formed with a minimal width to increase the aperture ratio.

A black matrix may be provided with apertures to minimize the overlap with gate lines and data lines to decrease the delay of signals transmitted through the gate lines and data lines. This will be described in more detail with reference to FIG. 3.

Figure 3:
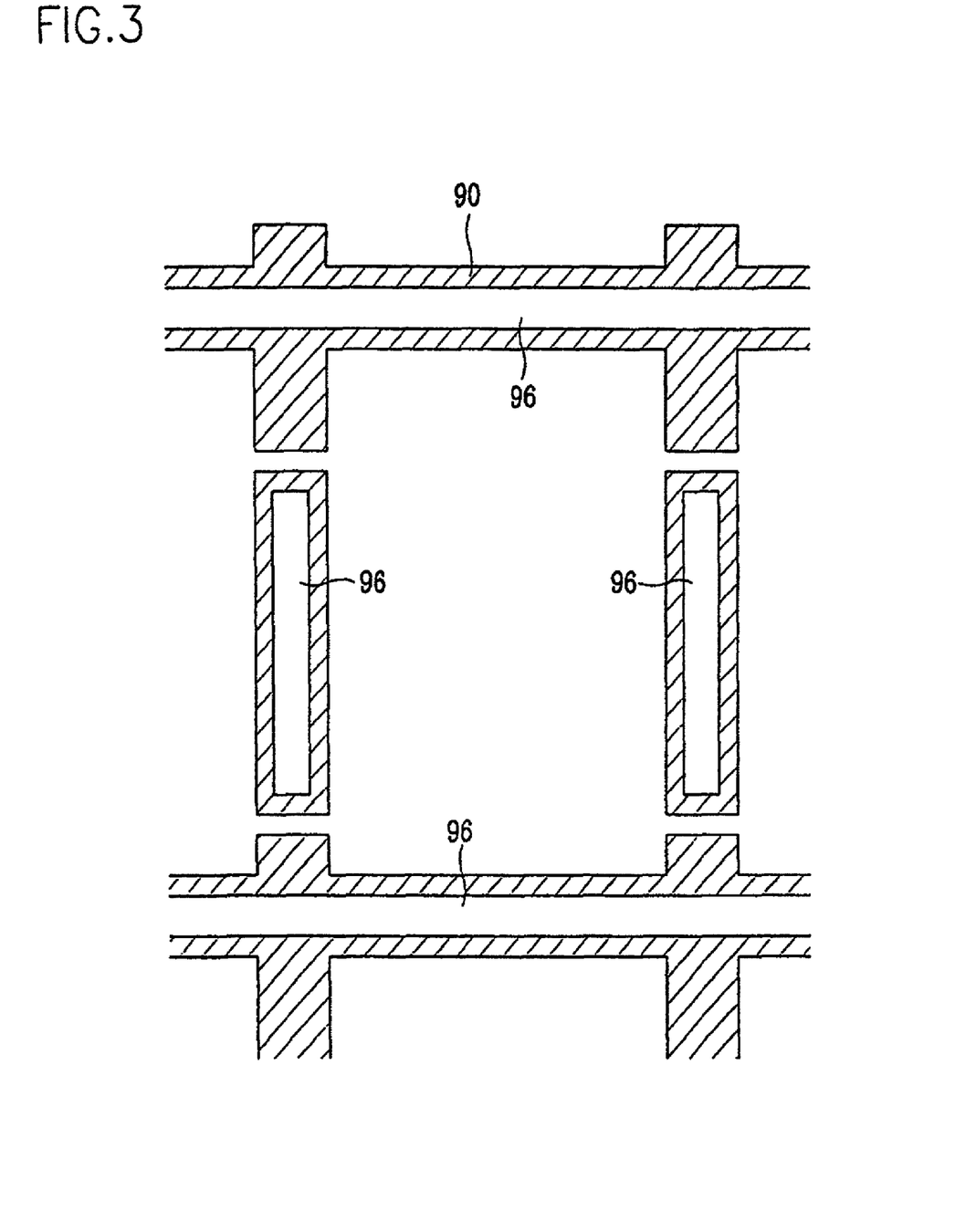
FIG. 3 is a schematic view showing a structure of a black matrix in transistor substrate according to a second preferred embodiment of the present invention.

FIG. 3 is a schematic view showing a structure of a black matrix in a thin film transistor substrate according to an example of the present invention.

As shown in the drawing, a black matrix 90 includes inner apertures 96 formed along a longitudinal direction within the horizontal and vertical portions 92 and 94 of the black matrix 90. The elements 22 and 26 of the gate wiring (FIG. 1) and the elements 62, 65 and 66 of the data wiring (FIG. 1) fully cover the inner apertures 96 and block the light passing through the inner apertures 96. With this configuration, the area of overlapping between the black matrix 90 and the elements 22 and 26 of the gate wiring, and also the elements 62, 65 and 66 of the data wiring is minimized to prevent the delay of the signals transmitted through the elements 22 and 26 of the gate wiring, and the elements 62, 65 and 66 of the data wiring.

The thin film transistor substrate of the first preferred embodiment described above may be identically applied to a planar-drive-type LCD in which the liquid crystal molecules are driven by forming substantially a flat electric field with respect to the common electrode 230 and the pixel electrodes 82, or to a LCD in which the liquid crystal molecules are aligned vertically to the substrates 10 and 200, or to a vertically-aligned LCD having a negative anisotropy. The present invention is particularly effective in reducing lateral crosstalk in the planar-drive-type LCD. In other words, since side crosstalk is generated by the leakage of light irradiated at an angle in the area on both sides of the data lines, by forming black matrix 94 under the data lines 62 of a width greater than that of the data lines 62, most of the light irradiated at an angle under the data lines 62 is blocked. In the planar-drive-type LCD, in order to form an electric field that is substantially parallel to the substrates, the common electrode and pixel electrodes are formed opposing each other linearly on the same substrate. Also, the common electrode and the pixel electrodes are formed on the same or different layers on the gate wiring, data wiring, or the protection layer.

In the present invention, horizontal portions 92 of the black matrix 90 of adjacent pixels are connected, while the vertical portions 94 are separated. However, it is possible to provide the opposite structure in which the vertical portions 94 are connected and the horizontal portions 92 are separated. It is also possible to separate both the horizontal and vertical portions 92 and 94 of the black matrix 90.

In the thin film transistor substrate of the preferred embodiments of the present invention, the black matrix can be used to repair disconnected wiring. With reference to FIG. 1, in the case where area A of the leftmost data line 62 is severed, a laser is irradiated on areas B of the black matrix 90 on both sides of area A such that the corresponding vertical portion 94 of the black matrix 90 shorts with the data line 62, thereby repairing the disconnected data line 62. Accordingly, the image signals transmitted through the repaired data line 62 pass through the black matrix 90 at the area of repair, then are again directed to the data line 62 after this portion is traversed.

In the same manner, if area C of the lower gate line 22 (in the drawing) is severed, a laser is irradiated on areas D of the black matrix 90 on both sides of area C to short-circuit the corresponding horizontal portion 92 of the black matrix 90 with the gate line 22, thereby repairing the disconnected gate line 22. At this time, the scanning signals transmitted through the repaired gate line 22 pass through the black matrix 90 at the area of repair, and then are again directed to the gate line 22 after this portion is traversed. In the case where there are a plurality of locations where lines have become disconnected, it is most effective for the repair of the gate lines 22 and the data lines 62 if the horizontal portions 92 and the vertical portions 94 of the black matrix 90 are formed intersecting to define areas corresponding to the unit pixels.

A vertically-aligned LCD, which aligns long axes of the liquid crystal molecules vertically to the upper and lower substrates when no voltage is applied to the electrodes of the substrates, has a high contrast ratio. Thus, such an LCD configuration is widely used and in a variety of ways. To obtain a wide viewing angle in the vertically aligned LCD, aperture patterns (patterned vertically-aligned liquid crystal displays-PVA LCDs) and protrusions are formed in the pixel electrodes 82 and the common electrode 230. The patterns and protrusions form a fringe field and control a pretilt angle of the moelecules such that the liquid crystal molecules are slanted uniformly in four different directions. This enables to obtain a wide viewing angle. In the PVA LCD, by forming one or more aperture patterns in the electrodes 82 and 230, a fringe field of a desired shape may be easily generated. It is also possible in the PVA LCD to form the black matrix 90 together with the thin film transistors to increase aperture portions. This will be described in more detail with reference to the drawings.

Figure 4:
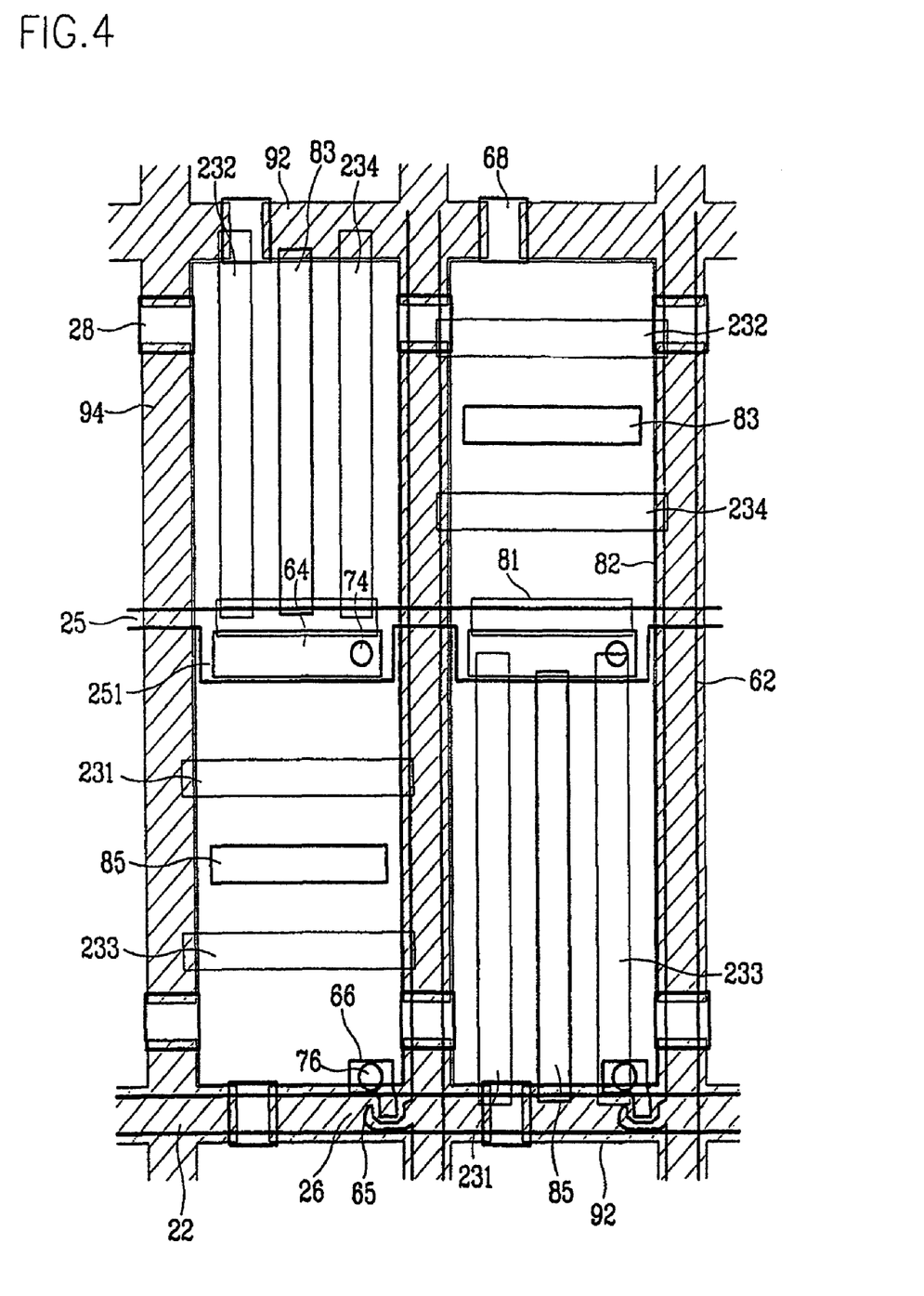
FIG. 4 is a schematic view showing a structure of pixels in a PVA-type liquid crystal display according to a third preferred embodiment of the present invention.

FIG. 4 is a schematic view showing a structure of pixels in a PVA-type liquid crystal display according to an example of the present invention. FIGS. 5A, 5B, 5C and 5D are schematic views respectively showing a black matrix pattern, gate wiring, data wiring and an electrode pattern of the liquid crystal display of FIG. 4. As shown in the drawings, much of the structure of the PVA-type LDC example is similar to that of the first preferred embodiment. Accordingly, like reference numerals are used for like elements and a detailed description of many of the elements will be omitted.

With reference to FIGS. 4, 5A, 5B, 5C and 5D, gate wiring includes gate lines 22 extending horizontally (in FIG. 4) and gate electrodes 26 of a thin film transistor, the gate electrodes 26 being a part of the gate lines 22. The gate wiring also includes storage electrodes 25, which overlap pixel electrodes 82 to form a storage capacitance. The storage electrodes 25 include protrusions 251 to ensure a sufficient storage capacitance. Formed on the same layer as the elements 22, 26, 25 and 251 of the gate wiring are first buffer layers 28. That is, the buffer layers 28 are formed over separated areas of vertical portions 94 of a black matrix 90 to block the leakage of light passing therethrough.

Figure 5A:
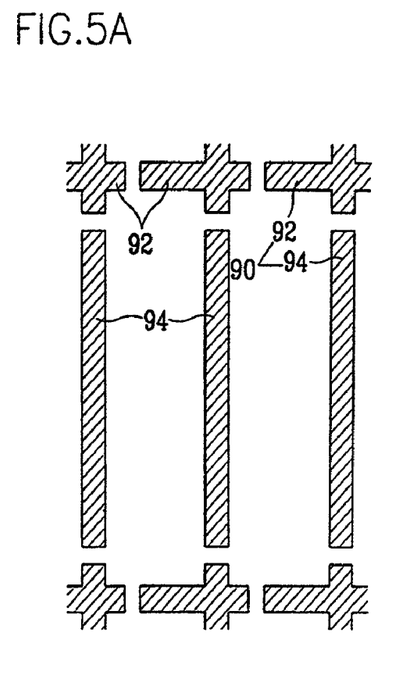
FIGS. 5A, 5B, 5C and 5D are schematic views respectively showing a black matrix pattern, gate wiring, data wiring and an electrode pattern of the liquid crystal display of FIG. 4.
Figure 5B:
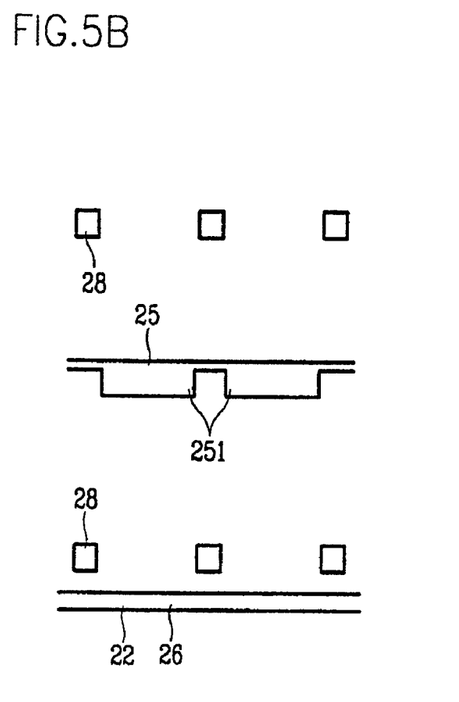
Figure 5C:
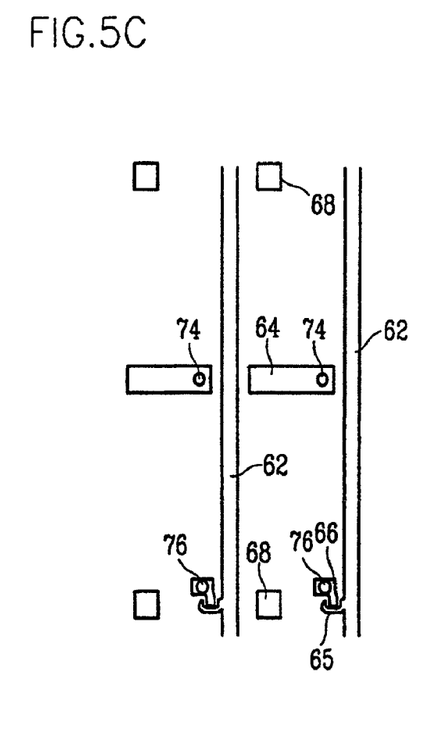

With reference to FIGS. 4 and 5C, data wiring includes data lines 62, which are formed vertically (in the drawings) to intersect the gate lines 22 and thereby form unit pixels; source electrodes 65 connected to the data lines 62 and extending over the gate electrodes 26; and drain electrodes 66 opposing the source electrodes 65 about the gate electrodes 26. The data wiring also includes storage electrode patterns 64. The storage electrode patterns 64 are positioned at areas corresponding to the storage electrodes 25 and are electrically connected to pixel electrodes 82 (to be described below) to form a storage capacitance with the storage electrodes 25.

Formed on the same layer as the elements 62, 65, 66 and 64 are second buffer layers 68. A plurality of the second buffer layers 68 are formed in locations corresponding to disconnected areas of horizontal portions 92 of the black matrix 90 to block the passage of light therethrough. Reference numerals 76 and 74 of the drawings refer to contact holes of a protection layer (see FIG. 2). The contact holes 76 and 74 expose the drain electrodes 66 and the storage electrode patterns 64, respectively, to make contact with the pixel electrodes 82.

Figure 5D:
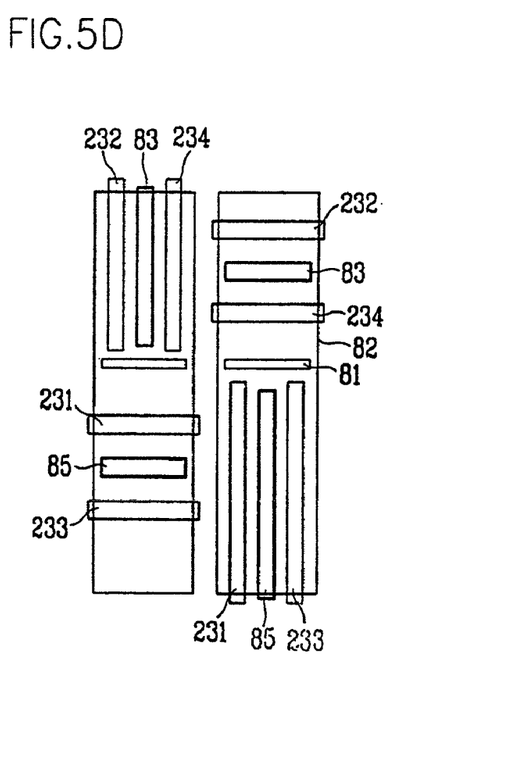

With reference to FIGS. 4 and 5D, first apertures 81 are formed horizontally (in the drawings) at a center portion of the pixel electrodes 82 to divide the pixel electrodes 82 into upper and lower portions (in the drawings). Further, second apertures 83 are formed either horizontally or vertically (in the drawings) at substantially a center of the upper portions of the pixel electrodes 82, and third apertures 85 are formed either horizontally or vertically at substantially a center of the lower portions of the pixel electrodes 82. Reference numerals 232 and 234 refer respectively to fourth and fifth apertures formed in the common electrode 230 (see FIG. 2) on opposing sides of the second apertures 83, and reference numerals 231 and 233 refer respectively to sixth and seventh apertures formed in the common electrode 230 on opposing sides of the third apertures 85.

In the structure of the PVA LCD described above, the horizontal portions 92 and the vertical portions 94 of the black matrix 90 can be used to repair the gate wiring and the data wiring as described with the previous embodiments. Since the black matrix 90 is formed together with the thin film transistors, an aperture ratio can be increased about 10%.

Although the apertures of the present invention are formed linearly or in a quadrilateral shape, it is possible to form the apertures in other shapes. Further, one or more pixels may be used so that the liquid crystal molecules are slanted in four directions, and the positioning and shape of the thin film transistors may be altered. This will be described with reference to the drawings.

Figure 6:
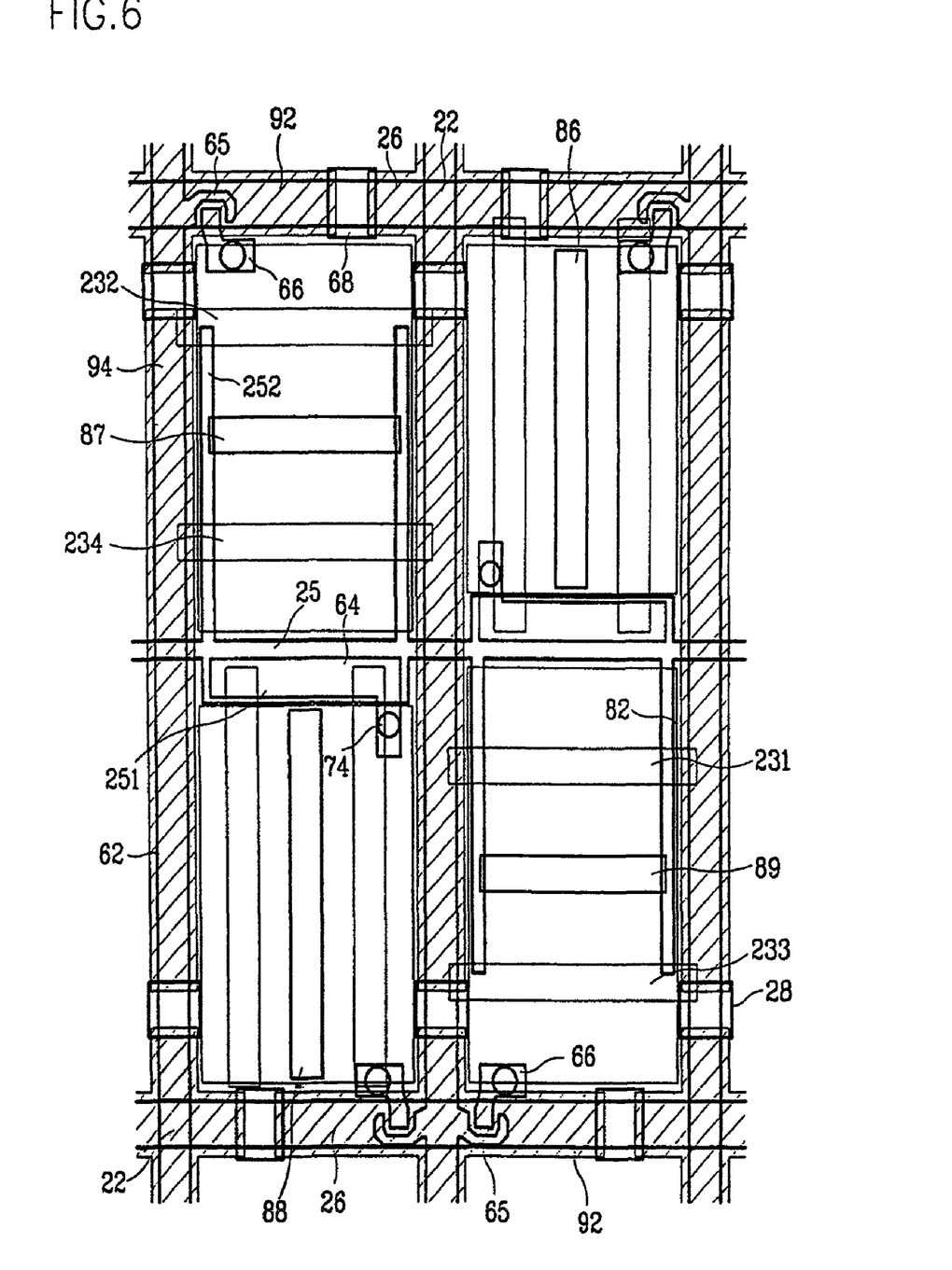
FIG. 6 is a schematic view showing a structure of pixels in a PVA-type liquid crystal display according to a fourth preferred embodiment of the present invention.

FIG. 6 is a schematic view showing a structure of pixels in a PVA-type liquid crystal display according to another example of the present invention, and FIGS. 7A, 7B, 7C and 7D are schematic views respectively showing a black matrix pattern, gate wiring, data wiring and an electrode pattern of the liquid crystal display of FIG. 6. As shown in the drawings, much of the structure of this example is similar to that of the previous example. Accordingly, like reference numerals are used for like elements and a detailed description of many of the elements will be omitted.

Figure 7A:
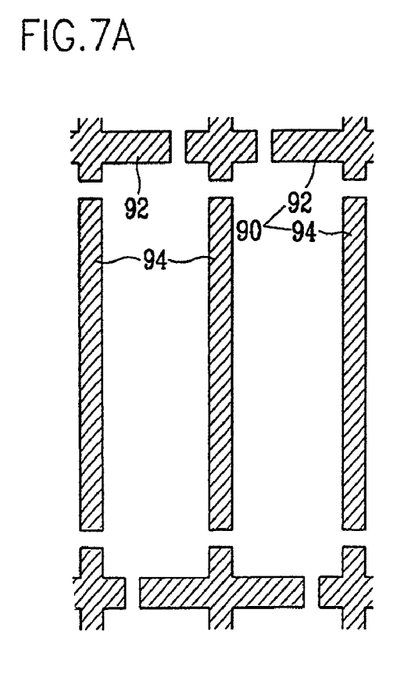
FIGS. 7A, 7B, 7C and 7D are schematic views respectively showing a black matrix pattern, gate wiring, data wiring and an electrode pattern of the liquid crystal display of FIG. 6.

In this example, pixels are arranged such that the liquid crystal molecules are aligned to four directions. A black matrix 90 is formed having a single aperture for each pair of pixels. That is, each aperture of the black matrix 90 extends over an area of two pixels, the widths of which are adjacent to one another. Storage electrodes 25 are formed in these areas between adjacent pixels, and elements 22 and 26 of gate wiring are provided extending at ends of each pair of pixels.

Figure 7B:
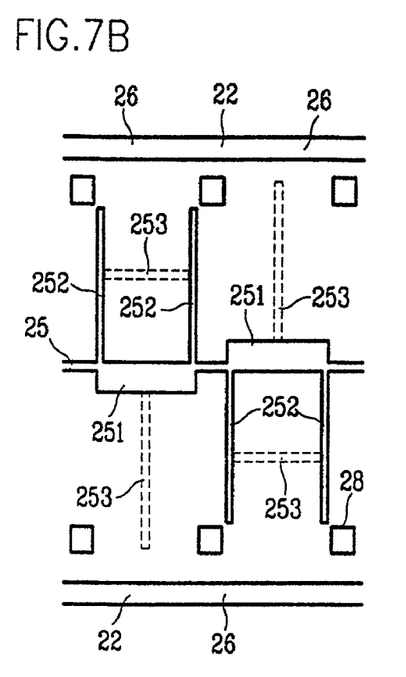
Figure 7C:
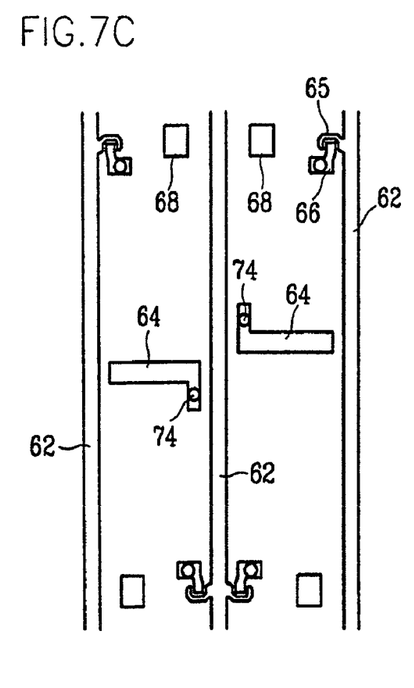
Figure 7D:
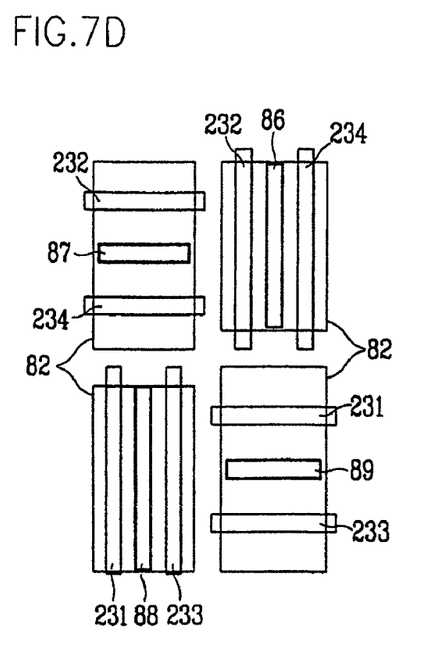

First light blocking layers 252 are formed extending from the storage electrodes to cover edges of first, second, third and fourth apertures 86, 87, 88 and 89, which are provided in pixels 82, when the apertures 86, 87, 88 and 89 are formed horizontally or vertically (in the drawings). Accordingly, texture, which dark on the screen as a result of the abnormal driving of the liquid crystal molecules, is covered and prevents the picture quality degradation. Further, second light blocking layers 253, as shown by the dotted lines of FIG. 7B, are formed horizontally across the first light blocking layers 252, or vertically in pixels where the first light blocking layers 252 are not extended. The second light blocking layers 253 prevent the leakage of light resulting from the abnormal driving of the liquid crystal molecules. The second light blocking layers 253 are optional. Reference numerals 231, 232, 233 and 234 of FIG. 7D are apertures formed in a common electrode 230.

In the thin film transistor substrate and method for repairing the same according to the present invention, the black matrix is formed together with the thin film transistors and wiring on the same substance to achieve a high aperture ratio. Further, the black matrix may be used to repair disconnected wires of the substrate.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A thin film transistor substrate for a liquid crystal display, comprising:
   an insulating substrate;
   a black matrix formed on said insulating substrate having apertures in areas of pixels and shaped as a net;
   an insulating layer covering said black matrix;
   a gate wiring formed on said insulating layer, said gate wiring including gate lines extended in a first direction across said substrate and gate electrodes connected to the gate lines;
   a gate insulating layer formed over said gate wiring;
   a semiconductor layer formed over said gate insulating layer;
   an ohmic contact layer formed over said semiconductor layer;
   a data wiring including source electrodes and drain electrodes formed separated from each other over said ohmic contact layer, and data lines connected to the source electrodes and crossing the gate lines to define the pixels;
   a protection layer formed over said data wiring; and
   pixel electrodes electrically connected to the drain electrodes,
   wherein the black matrix includes first portions parallel with the gate lines and each of the first portions is separated from each other.

2. The substrate of claim 1, further comprising a buffer layer formed on the same layer as said gate wiring and said data wiring, the buffer layer being formed between portions of the black matrix.

3. The substrate of claim 2, wherein the black matrix includes first portions overlapping the gate lines, and second portions separated from the first portions and overlapping the data lines.

4. The substrate of claim 3, wherein a portion of the black matrix overlapping the gate wiring or the data wiring is removed.

5. The substrate of claim 1, wherein the black matrix is formed overlapping adjacent pixel electrodes.

6. The substrate of claim 5, wherein a overlapping width of the pixel electrodes and the black matrix is in the range of 0.5-2 μm.

7. The substrate of claim 1, wherein the pixel electrodes and the data lines are spaced apart by a distance in the range of 2-6 μm.

8. The substrate of claim 1, wherein the insulating layer contains silicon oxide.

9. The substrate of claim 1, wherein the insulating layer is formed to a thickness of 0.5-3 μm.

10. The substrate of claim 1, wherein the substrate is used in a vertically-aligned liquid crystal display, in which liquid crystal molecules are aligned vertically to the substrate.

11. The substrate of claim 1, wherein liquid crystal molecules are aligned parallel to the substrate and the pixel electrodes are formed linearly, and which further comprises a linear common electrode opposing the pixel electrodes.

* * * * *